United States Patent [19]

Schwartz

[11] 4,387,455
[45] Jun. 7, 1983

[54] APPARATUS AND METHOD FOR TRANSMISSION OF COMMUNICATIONS

[76] Inventor: Nira Schwartz, Rehov David 14, Moshav Magshimim, Doar Yahud, Israel

[21] Appl. No.: 283,086

[22] Filed: Jul. 13, 1981

[30] Foreign Application Priority Data

Jun. 18, 1981 [IL] Israel .................................. 63117

[51] Int. Cl.³ .................. H04L 9/00; H04N 7/12; G08C 25/00
[52] U.S. Cl. .................................. 370/11; 178/22.19
[58] Field of Search .................. 370/11; 178/22.19; 179/1.5 R, 1.5 E; 371/40

[56] References Cited

U.S. PATENT DOCUMENTS

| 3,278,729 | 10/1966 | Chien | 371/40 |
| 3,657,699 | 4/1972 | Rocher et al. | 178/22.19 |
| 3,849,595 | 11/1974 | Ishiguro | 370/11 |
| 4,086,435 | 4/1978 | Graupe et al. | 179/1.5 E |
| 4,176,247 | 11/1979 | Englund | 178/22.19 |

Primary Examiner—Thomas A. Robinson
Attorney, Agent, or Firm—Browdy and Neimark

[57] ABSTRACT

Apparatus for transmission of information in digital form comprising apparatus for providing a plurality of signals coded into a multiplicity of digital code elements in accordance with a first modulation technique; and apparatus for providing a plurality of coded addresses for transmission, each of the coded addresses representing a digital code in accordance with a second modulation technique corresponding to a combination of code elements of individual ones of the plurality of signals.

34 Claims, 5 Drawing Figures

| A | 0 | 0 | 1 | 1 | 1 | 1 | 0 | 0 | .... |
|---|---|---|---|---|---|---|---|---|------|
| B | 0 | 0 | 0 | 1 | 1 | 1 | 1 | 1 | ...... |
| C | 1 | 0 | 1 | 1 | 0 | 0 | 0 | 1 | |
| D | 1 | 1 | 0 | 1 | 1 | 0 | 0 | 1 | |

FIG. 2

| ROW \ COLUMN 18 | | | | | | | | | | | | | | | | |
|---|---|---|---|---|---|---|---|---|---|---|---|---|---|---|---|---|
| 1 | 0 | 0 | 0 | 0 | 0 | 0 | 0 | 0 | 1 | 1 | 1 | 1 | 1 | 1 | 1 | ... |
| 2 | 0 | 1 | 0 | 1 | 0 | 1 | 0 | 1 | 0 | 1 | 0 | 1 | 0 | 1 | 0 | 1 | ... |
| 3 | 0 | 0 | 1 | 1 | 0 | 0 | 1 | 1 | 0 | 0 | 1 | 1 | 0 | 0 | 1 | 1 | ... |
| 4 | 0 | 0 | 0 | 0 | 1 | 1 | 1 | 1 | 0 | 0 | 0 | 0 | 1 | 1 | 1 | 1 | ... |
| ⋮ | | | | | | | | | | | | | | | | |
| n | | | | | | | | | | | | | | | | |
| | $f_1$ | $f_2$ | $f_3$ | $f_4$ | $f_5$ | $f_6$ | $f_7$ | $f_8$ | $f_9$ | $f_{10}$ | $f_{11}$ | $f_{12}$ | $f_{13}$ | $f_{14}$ | $f_{15}$ | $f_{16}$ |

FIG. 3

APPARATUS AND METHOD FOR TRANSMISSION OF COMMUNICATIONS

FIELD OF THE INVENTION

The present invention relates to communications apparatus and techniques generally and more particularly to techniques for transmission of multiple conversations along a digital communications link.

BACKGROUND OF THE INVENTION

It is well known to transmit a multiplicity of conversations along a single transmission link by digital techniques. This is achieved by periodic sampling of an analog signal and transmitting the samples in digital form rather than the signals themselves. The Nyquist sampling theorem fixes the minimum sampling rate as twice the highest frequency of the signal being sampled.

One widely used technique for digital information transmission is PCM, i.e. pulse code modulation, whereby each sample is expressed in an 8 bit code. Various other types of coding for digital information transmission are also known and used. All of the conventional digital transmission techniques are characterized in that only a single sample relating to a single conversation is being transmitted at any one time. Therefore, using conventional technology, one can transmit 30 voice and 2 signalling channels over a single communications link.

It is also known to apply two modulations onto a single carrier signal, such as AM and FM for example. These two modulations are totally independent of each other and are not interactive. The use of multiple modulations in this manner can provide simultaneous transmission of only as many different channels as there are different modulations.

SUMMARY OF THE INVENTION

The present invention seeks to overcome limitations of the prior art digital communications apparatus and techniques and to provide apparatus and a technique for digital communications which enables a plurality of digital samples to be simultaneously transmitted over a single communications link.

There is thus provided in accordance with an embodiment of the present invention digital communications apparatus comprising a transmitter, a receiver, apparatus for sampling a plurality of analog signals, apparatus for converting each sample of each signal into a first digital code in accordance with a first modulation technique, apparatus for indicating the coincidence of a plurality of code elements of the first digital code to provide a plurality of signals in a second digital code in accordance with a second modulation technique; apparatus for supplying information coded in accordance with the first and second modulation techniques to the transmitter for transmission thereof and decoding apparatus associated with the receiver for decoding the received coded information.

The first and second modulation techniques may be any suitable modulation techniques and may be selected from the following group of modulation techniques: PCM, FM, AM, PWM or combinations thereof, but are not limited to these techniques.

Further in accordance with an embodiment of the invention there is provided a technique for simultaneous transmission of a plurality of signals along a data link and comprising the steps of converting each of the plurality of signals to a digitally coded messsage in accordance with a first modulation technique and representing a combination of elements from a plurality of digitally coded messages corresponding to a plurality of signals in a digitally coded message in accordance with a second modulation technique.

Additionally in accordance with an embodiment of the present invention, there is provided a technique for transmission of information in digital form comprising the step of transmitting information which is simultaneously coded in accordance with first and second modulation techniques.

Still further in accordance with an embodiment of the present invention there is provided apparatus for digital transmission comprising means for providing a plurality of signals coded in accordance with a first modulation technique; means for providing a plurality of addresses coded in accordance with a second modulation technique and corresponding to combinations of code elements corresponding to a plurality of signals; and means for transmitting the addresses in accordance with the first and second modulation techniques.

BRIEF DESCRIPTION OF THE DRAWINGS

The present invention will be more fully understood and appreciated from the following detailed description taken in conjunction with the drawing in which:

FIG. 2 is an example of contents of a RAM-type memory used in the present invention for arranging the code elements of a plurality of conversations;

FIG. 3 is an example of part of a coding table useful in accordance with the present invention;

DETAILED DESCRIPTION OF THE INVENTION

Figure 1:
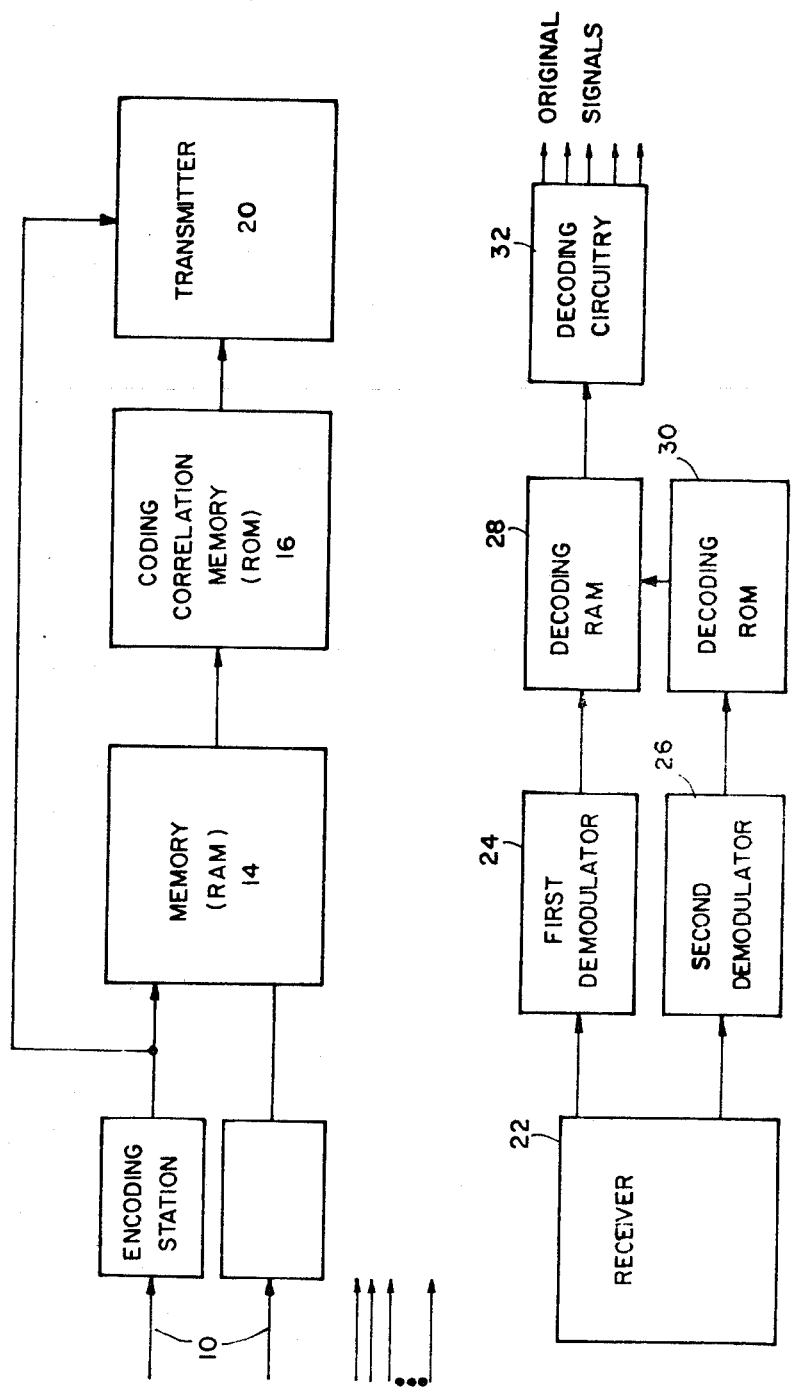
FIG. 1 is a block diagram illustration of communications apparatus constructed and operative in accordance with an embodiment of the present invention.

Reference is now made to FIG. 1 which illustrates apparatus for the simultaneous transmission of a plurality of signals in digital form constructed and operative in accordance with an embodiment of the present invention.

Each signal, which shall hereinafter be termed a "call" and which may comprise voice signals or information in any other form is received by the apparatus at an input port 10 and supplied to an encoding station 12, of conventional construction, which converts the information into digital form in accordance with a desired modulation coding, such as, for example, PCM, Pulse width modulation-PWM, or any other suitable modulation coding. According to an alternative embodiment of the invention, information may be received in pre-coded form and in such a case, encoding station 12 may be eliminated.

The digital information from each encoding station 12 or from a pre-coded signal source is preferably coded into an identical modulation coding. Alternatively, the modulation coding of the various calls are selected to be mutually compatible for the processing that follows. The outputs from each encoding station 12 and the pre-coded signals, if any, are all supplied to a memory 14, of conventional construction, in which the content of a given portion of each of the signals is entered, each call being arranged in a horizontal row, as illustrated in FIG. 2.

Referring briefly to FIG. 2, it is seen that the coded information from each of calls A, B, C, D etc. is arranged in superimposed rows, such that each code element or bit also forms part of a column. In accordance with the invention, the memory 14 operates in two modes, firstly, an information entry mode in which all of the rows corresponding to all of the calls are filled and secondly in a read-out mode during which the information entered in the rows is read out column-by-column to a coding correlation memory 16. The coding-correlation memory contains a table, illustrated in FIG. 3, in which each possible combination of code elements in a column is associated with an address code.

The table of FIG. 3 comprises a plurality of columns 18, each of which is identified with a code address $f_{xy}$ containing sufficient bits to fully identify the contents of the particular column.

The output of coding correlation memory 16 may be expressed in any desired modulation technique, such as AM, FM, PWM, etc. For clarity, this modulation technique is termed "second modulation technique" while the modulation technique in which the individual calls are expressed is termed the "first modulation technique."

The output of one encoding station 12 is supplied to a transmitter 20 as a carrier signal which is modulated to carry information from one call according to the first modulation technique. Transmitter 20 also receives an input from correlation memory 16 which is operative to cause further modulation of each code element according to the second modulation technique. The resulting transmitted signal may appear as illustrated in FIG. 4.

Figure 4:
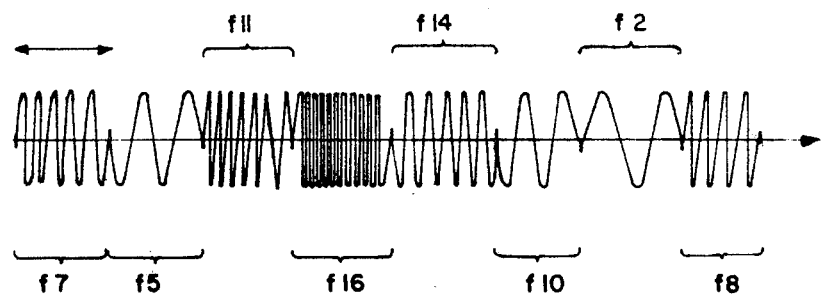
FIG. 4 is a waveform diagram of a transmission waveform constructed in accordance with the present invention.
Figure 5:
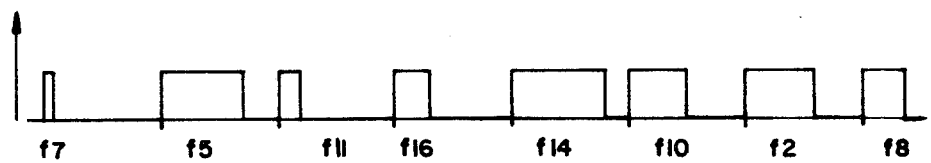
FIG. 5 is a waveform diagram of a different type of transmission waveform constructed in accordance with the present invention.

FIG. 4 illustrates a typical signal which may be transmitted in accordance with an embodiment of the present invention and which comprises a PCM carrier, each of the code elements thereof being modulated by an FM technique. Alternatively the first and second modulation techniques may be selected to be any other two different modulation techniques as mentioned above. For example, there is illustrated in FIG. 5 a PCM carrier signal wherein each of the code elements is further modulated by Pulse Width Modulation PWM.

At the receiving end there is provided a receiver 22 which provides outputs to first and second demodulators 24 and 26 operating in accordance with respective first and second modulation techniques. The output of the first demodulator is supplied directly to a decoding RAM 28 and provides the first row of a table which corresponds to the table of FIG. 2, and thus defines the arrangement of the columns. The output of the second demodulator is supplied to a decoding ROM 30 having a table corresponding to the table of FIG. 3 and providing a column by column output in response to the address codes received from the output of the second demodulator. The output of the decoding ROM is supplied to the decoding RAM 28 and supplies the remainder of the various columns.

According to an alternative embodiment of the invention, the carrier may not carry information encoded only in accordance with the first modulation technique. In such a case, the first demodulator 24 may be eliminated and all of the rows in RAM 28 are supplied from the output of ROM 30. No direct connection is provided between an encoding station 12 and the transmitter.

Similarly to the operation of memory 14, the decoding RAM operates in two modes, firstly to receive the information, as described hereinabove and next to read it out in row form, in parallel to decoding circuitry 32 which converts it to its original form as voice signals or any other signals. As noted above, where pre-coded signals are being transmitted, the decoding circuitry 32 may be eliminated.

It is a particular feature of the present invention that in contrast to the prior art, the transmitted signal is modulated by two different modulation techniques in an interactive manner such that both modulations contribute information which together is capable of defining signals transmitted simultaneously over a plurality of channels. According to a preferred embodiment of the present invention, the second modulation is applied discretely to individual ones or groups of time slots, such that the decoded information from the second modulation can be sequentially assigned to corresponding time slots with the information from the first modulation in order to provide information which can then be finally decoded in accordance with the first modulation technique.

It will be appreciated by persons skilled in the art that the invention is not limited to what has been particularly shown and described hereinabove. Rather the scope of the present invention is defined only by the claims which follow:

I claim:

1. Apparatus for transmission of information in digital form comprising:
   means for providing a plurality of signals in parallel coded into a multiplicity of digital code elements in accordance with a first modulation technique; and
   means for providing a plurality of coded addresses for transmission, each of said coded addresses representing a digital code in accordance with a second modulation technique corresponding to a combination of code elements of individual ones of said plurality of signals.

2. Apparatus according to claim 1 and also comprising means for transmitting said coded addresses in accordance with said first modulation technique.

3. Apparatus according to claim 1 and also comprising means for transmitting said coded addresses in accordance with said second modulation technique.

4. Apparatus according to claim 1 and also comprising means for receiving and decoding said coded addresses in order to provide said plurality of signals.

5. Apparatus according to claim 2 and also comprising means for receiving and decoding said coded addresses in order to provide said plurality of signals.

6. Apparatus according to claim 3 and also comprising means for receiving and decoding said coded addresses in order to provide said plurality of signals.

7. Apparatus according to claim 1 and also comprising means for sampling a plurality of analog signals for providing said plurality of signals.

8. Apparatus according to claim 2 and also comprising means for sampling a plurality of analog signals for providing said plurality of signals.

9. Apparatus according to claim 3 and also comprising means for sampling a plurality of analog signals for providing said plurality of signals.

10. Apparatus according to claim 4 and also comprising means for sampling a plurality of analog signals for providing said plurality of signals.

11. Apparatus according to claim 5 and also comprising means for sampling a plurality of analog signals for providing said plurality of signals.

12. Apparatus according to claim 6 and also comprising means for sampling a plurality of analog signals for providing said plurality of signals.

13. Apparatus according to claim 1 and wherein said means for providing a plurality of coded addresses comprise memory means storing a plurality of addresses corresponding to a plurality of combinations of code elements.

14. Apparatus according to claim 2 and wherein said means for providing a plurality of coded addresses comprise memory means storing a plurality of addresses corresponding to a plurality of combinations of code elements.

15. Apparatus according to claim 3 and wherein said means for providing a plurality of coded addresses comprise memory means storing a plurality of addresses corresponding to a plurality of combinations of code elements.

16. Apparatus according to claim 4 and wherein said means for providing a plurality of coded addresses comprise memory means storing a plurality of addresses corresponding to a plurality of combinations of code elements.

17. Apparatus according to claim 5 and wherein said means for providing a plurality of coded addresses comprise memory means storing a plurality of addresses corresponding to a plurality of combinations of code elements.

18. Apparatus according to claim 6 and wherein said means for providing a plurality of coded addresses comprise memory means storing a plurality of addresses corresponding to a plurality of combinations of code elements.

19. Apparatus according to claim 7 and wherein said means for providing a plurality of coded addresses comprise memory means storing a plurality of addresses corresponding to a plurality of combinations of code elements.

20. Apparatus according to claim 8 and wherein said means for providing a plurality of coded addresses comprise memory means storing a plurality of addresses corresponding to a plurality of combinations of code elements.

21. Apparatus according to claim 9 and wherein said means for providing a plurality of coded addresses comprise memory means storing a plurality of addresses corresponding to a plurality of combinations of code elements.

22. Apparatus according to claim 10 and wherein said means for providing a plurality of coded addresses comprise memory means storing a plurality of addresses corresponding to a plurality of combinations of code elements.

23. Apparatus according to claim 11 and wherein said means for providing a plurality of coded addresses comprise memory means storing a plurality of addresses corresponding to a plurality of combinations of code elements.

24. Apparatus according to claim 12 and wherein said means for providing a plurality of coded addresses comprise memory means storing a plurality of addresses corresponding to a plurality of combinations of code elements.

25. Apparatus according to any of claims 1–24 and wherein said first modulation technique is PCM and said second modulation technique is FM.

26. Apparatus according to any of claims 1–24 and wherein said first modulation technique is PCM and said second modulation technique is pulse width modulation.

27. Apparatus according to any of claims 1–24 and wherein said first modulation technique is PCM and said second modulation technique is AM.

28. Apparatus for transmission of information in digital form comprising:
   first means for modulating a carrier wave by means of a first modulation technique which defines time slots corresponding to digital information bits; and
   second means for modulating said carrier wave by means of a second modulation technique which is applied discretely to individual time slots.

29. Apparatus according to claim 28 and wherein said second modulation means comprises means for modulating said carrier wave by said second modulation technique at each individual time slot, separately.

30. Apparatus according to claim 28 and wherein said second modulation means comprises means for modulating said carrier wave by said second modulation technique separately at groups of a plurality of individual time slots.

31. Apparatus according to any of claims 28–30 and also comprising means for receiving the transmitted modulated carrier wave and decoding same in accordance with said second modulation technique.

32. A method for transmission of information in digital form comprising the steps of:
   providing a plurality of signals in parallel coded into a multiplicity of digital code elements in accordance with a first modulation technique; and
   providing a plurality of coded addresses for transmission, each of said coded addresses representing a digital code in accordance with a second modulation technique corresponding to a combination of code elements of individual ones of said plurality of signals.

33. A method for transmission of information in digital form comprising the steps of:
   modulating a carrier wave by means of a first modulation technique which defines time slots corresponding to digital information bits; and
   modulating said carrier wave further by means of a second modulation technique which is applied discretely to individual time slots.

34. A method according to either of claims 32 and 33 and also comprising the step of transmitting the digital information in modulated form.

* * * * *